(No Model.) 2 Sheets—Sheet 1.

E. LÜDEKE
VELOCIPEDE.

No. 269,076. Patented Dec. 12, 1882.

Attest:
Walter D. Baldwin
F. L. Middleton

Inventor
Edward Lüdeke
by Ellen Spear
Atty.

(No Model.) 2 Sheets—Sheet 2.
E. LÜDEKE
VELOCIPEDE.
No. 269,076. Patented Dec. 12, 1882.
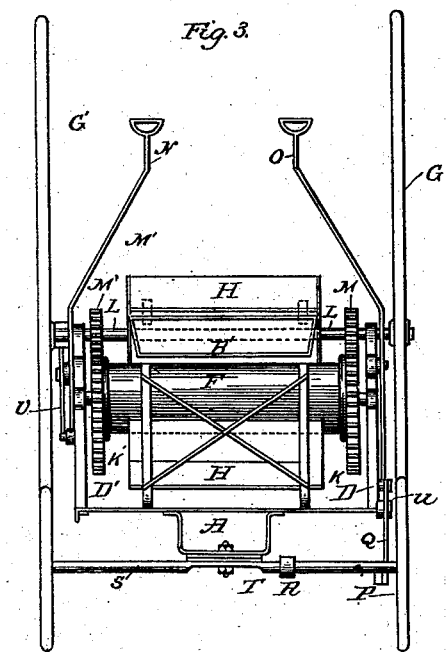
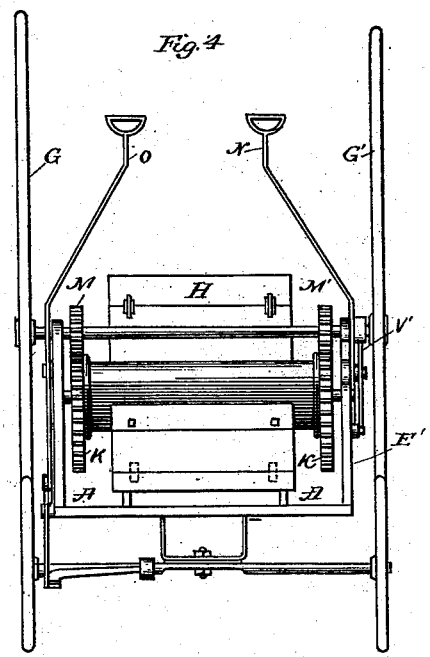
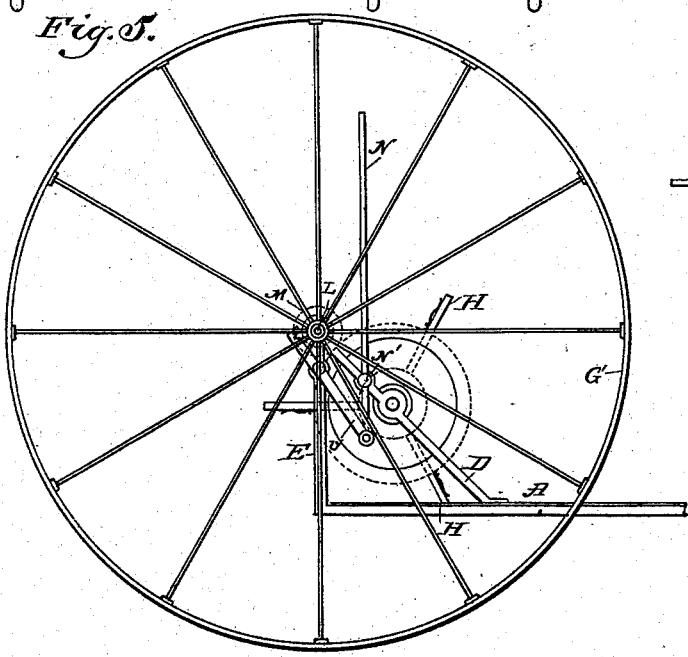
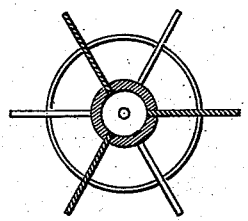

UNITED STATES PATENT OFFICE.

EDUARD LÜDEKE, OF GOTTINGEN, HANOVER, GERMANY.

VELOCIPEDE.

SPECIFICATION forming part of Letters Patent No. 269,076, dated December 12, 1882.

Application filed August 5, 1882. (No model.)

*To all whom it may concern:*

Be it known that I, EDUARD LÜDEKE, of the town of Gottingen, in the Province of Hanover, in the Empire of Germany, have invented certain new and useful improvements in vehicles which are driven by means of treading in combination with the personal weight, which said improvements can be also applied to boats or other vessels.

My improved vehicle is not propelled by the exertion of power of the occupant, but by means of his bodily weight, which enables long distances to be executed with this vehicle without fatigue. By the proportion of the tooth-wheels one to the other, and by the employment of large driving-wheels, I attain a velocity far exceeding that attained by other vehicles propelled by manual power—such as velocipedes, trolleys, or others.

Figure 1:
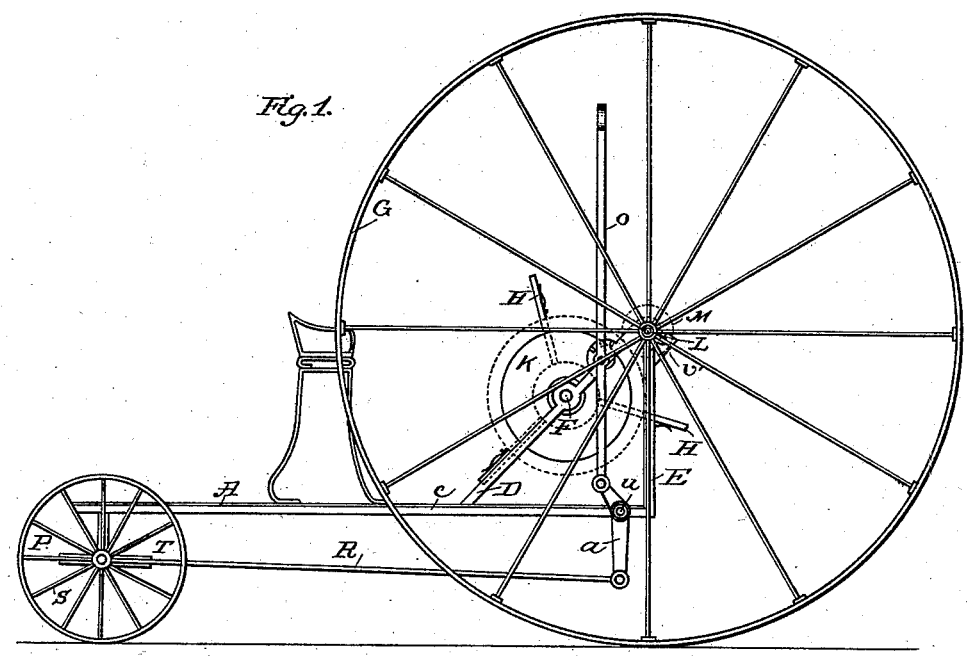
Figure 2:
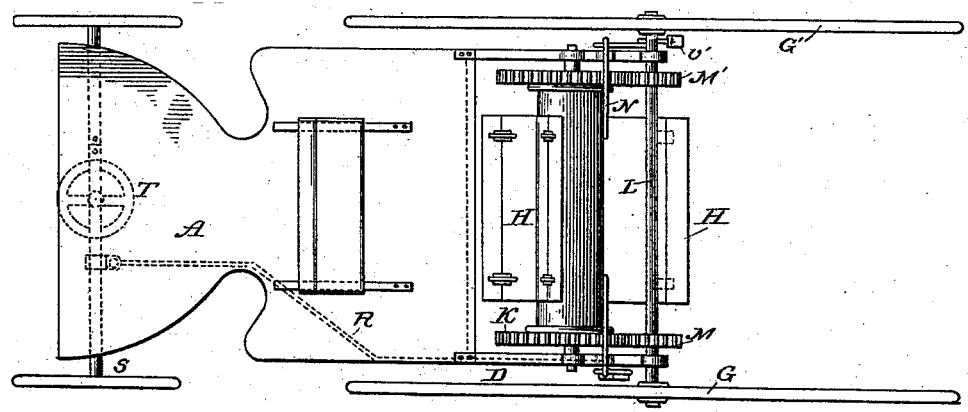

The invention is shown in the accompanying drawings, of which Figure 1 is a side view of the vehicle; Fig. 2, a top view of the same; Fig. 3, a rear elevation; Fig. 4, a front elevation. Fig. 5 is another side view, showing the brake arrangement. Fig. 6 shows a section through the tread-wheel of a modification in the manner of arranging the tread-boards.

A is the main platform, upon which the seat B, for one or two persons, is arranged. C indicates the position of the person who propels the vehicle.

For carrying the tread-wheel F, the driving-wheels G G', the brake arrangement, and steering arrangement, suitable supports are arranged on each side of the main platform A, toward the front, which said supports or brackets consist of the slanting rods D and D' and the vertical rods E E'. The tread-wheel F is borne between the supports D D', and is provided with three or more tread-boards, H, which are fixed onto the wood covering of the axle I. On each end of this wood covering small tooth-wheels K and K' are situated on the axle I, which said tooth-wheels are in gear with smaller tooth-wheels M M', which are fixed on the axle L of the driving-wheels G G'. When the vehicle is to be set in motion, the person standing at C grasps the handles of the levers N and O and mounts one of the treadles or boards H. By the force of the weight the axle I is caused to turn round, and with a transfer proportion of one to three the driving-wheels are caused to perform three revolutions for every one of the axle I. The tread-boards are so broad that they would strike against the axle L, and therefore, in order to avoid this, they are made in two parts and connected together by hinges, and retained in straightened position by means of springs. Upon striking the axle L the tread-boards double up, and after passing the axle they are straightened out again by means of the spring. This arrangement possesses also the advantage that injury cannot occur when the foot slips, as the tread-boards double up upon touching the legs.

Two small friction-rollers can be arranged on the outer edges of the tread-boards to slide on corresponding rails or strips on the axle L, in order to decrease the friction and avoid concussion. In Fig. 6 the tread-boards are arranged in such a manner that there are three tread-boards for each foot, which said tread-boards extend only half-way in the longitudinal direction of the drum or axle, and occupy intermediate positions to one another.

The following is a description of the steering or guiding arrangement:

The lever O is fixed on a pivot on the support D, and at its lower end is in connection with a bent lever, Q, which is fixed to the platform A. The lower end of this said bent lever Q is fixed to a connecting-rod, R, which is at its opposite extremity attached to the axle S of the hind wheels, P. When the lever O is pulled back or pressed forward the axle S turns in horizontal direction on the pivot T, and thus the vehicle is steered or guided to the left or right.

In order to cause the lever O to return to its original position, a strong spiral spring is arranged on the pivot U of the bent lever Q.

The following is a description of the brake mechanism:

On the left side of the vehicle the lever N is attached to the slanting support D', and turns on the pivot N', and is employed for tightening up the brake. This said lever N comes into contact with one of the arms of a two-armed lever, V', which turns on a pivot, V, and when the said lever N is pulled over it causes the other arm of the two-armed lever V' to press the brake-block tightly against the axle L, by which means the vehicle is brought to a standstill. The lever N is caused to return to its original position by means of a spiral spring arranged on the pivot N'. The wheel G' is fixed tightly on the axle, so that it grinds or drags when the brake is put on, and thus prevents any further motion. The wheel G, however, runs loosely on the axle, in order to facilitate the steering. If, for instance, I employ for my vehicle a wheel of two meters' diameter and the proportion of the tooth-wheels is one to three, I can, when the tread-wheel is caused to perform thirty revolutions per minute, cover a distance of five hundred and sixty-five meters ($2\times3.14=6.28=$circumference of driving-wheel, $6.28\times90$ (number of revolutions)$=565$ meters.) This number of revolutions of the tread-wheel can be attained without great exertion, and this speed corresponds nearly to that of a goods train.

By the described arrangement of the tread-wheel my vehicle possesses the great advantage that no dead-point occurs, as is the case when motion is produced by cranks.

The platform can be so arranged that six to eight persons can be accommodated thereon and still room left for luggage.

Having now described my said invention and the manner in which the same is to be carried into effect, I claim and desire to secure by Letters Patent—

1. A velocipede consisting of a pair of driving-wheels, a platform and frame, a transverse shaft journaled in such frame, a wheel, F, mounted on such shaft, and having radial tread-board and gearing adapted to communicate the motion of said transverse shaft to the driving-wheels, as shown.

2. The jointed tread-board having the spring, as described.

3. The lever o, in combination with the bell-crank Q, the spring, the pitman R, and the pivoted rear axle.

4. The shaft I and wheel F, forming a wooden covering for the shaft, in combination with the tread-boards.

EDUARD LÜDEKE.

Witnesses:
EDWIN A. BRYDGES,
JOHN O. TONKIN.